US008818973B1

(12) United States Patent
O'Neill (10) Patent No.: US 8,818,973 B1
(45) Date of Patent: Aug. 26, 2014

(54) GENERATION AND VENDING OF UNIQUE SEQUENCE VALUES

(75) Inventor: Brian O'Neill, Bellevue, WA (US)

(73) Assignee: Amazon Technologies, Inc., Reno, NV (US)

(*) Notice: Subject to any disclaimer, the term of this patent is extended or adjusted under 35 U.S.C. 154(b) by 1311 days.

(21) Appl. No.: 12/033,847

(22) Filed: Feb. 19, 2008

(51) Int. Cl.
*G06F 17/30* (2006.01)
(52) U.S. Cl.
USPC .......................................................... 707/703
(58) Field of Classification Search
USPC .......................................................... 707/703
See application file for complete search history.

(56) References Cited

U.S. PATENT DOCUMENTS

| 5,869,825 | A | * | 2/1999 | Ziarno | 235/380 |
| 6,332,175 | B1 | * | 12/2001 | Birrell et al. | 711/112 |
| 6,363,372 | B1 | * | 3/2002 | Lichterman | 1/1 |
| 6,714,948 | B1 | * | 3/2004 | Richards | 1/1 |
| 2002/0077837 | A1 | * | 6/2002 | Krueger et al. | 705/1 |
| 2004/0225736 | A1 | * | 11/2004 | Raphael | 709/226 |
| 2006/0155770 | A1 | * | 7/2006 | Asher et al. | 707/104.1 |
| 2006/0235675 | A1 | * | 10/2006 | Oslake et al. | 703/21 |

* cited by examiner

*Primary Examiner* — Jorge A Casanova
(74) *Attorney, Agent, or Firm* — Lee & Hayes, PLLC (57) ABSTRACT

Techniques for generating and vending of unique sequence values are described. Each master of a ring of masters is configured to create and vend the unique sequence values downstream to filling pools for eventual client consumption. When a ring of masters is employed, each master communicates with one another to agree on a current range of values that should next be vended. A master may then vend these values to a layer of one or more filling pools, at least of which includes or has access to persistent and non-persistent storage memories.

23 Claims, 6 Drawing Sheets

GENERATION AND VENDING OF UNIQUE SEQUENCE VALUES

BACKGROUND

Database records sometimes use a unique identifier for storing, tracking, sorting, or analyzing each record. For instance, each time that a customer visits a site of a service provider and purchases an item via the site, the service provider or some other entity can assign a unique identifier to the purchase. The service provider then stores this unique identifier, which is now associated with the order, in a database. The identifier is then used to track the order as it progresses through the order's life, from the customer's initial request to purchase the item to the actual fulfillment of the order.

Additionally, the service provider or another entity stores this unique identifier in association with the order well after the order has been fulfilled, perhaps indefinitely. The service provider may leverage the knowledge of the order, as well as other orders, to glean important information about the service provider's business. This information may also be used in many other important and diverse ways, all of which are made possible by the originally-assigned unique identifier. While the assigning of unique identifiers is important in a customer order context, such identifiers are equally important in many other areas of database records.

In some traditional settings, a single entity has produced these unique identifiers one at a time and on an on-demand basis. For instance, when the service provider from above receives the request to purchase an item from the customer, the service provider typically asks the entity to generate and provide a single unique identifier. The entity then creates and sends this unique identifier to the service provider (or an agent of the service provider), who associates the identifier with the customer order. All this while, however, the customer who placed the order has been waiting for the site to process the customer's request to purchase the item. While the wait may only last on the order of a few seconds, decreasing this time generally leaves a far better impression on the customer and allows the customer to continue shopping on the site or otherwise continue with his or her day. Additionally, while the wait time may only be a matter of seconds for a single customer, this delay represents a very large aggregate delay for a service provider who services customers on a nation- or even world-wide scale. Additionally, if only a single entity is supplying the unique identifiers, the failure of this entity (or a broken communication connection to this entity) can cause an entire operation to shut down its operations during the outage.

Accordingly, there remains a need, among others, for generating and receiving unique identifiers for use in storing database records that address such concerns.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to, among others, the generation and vending of unique sequence values for use in identification of database records. In lieu of a traditional system where these values are rather inefficiently generated and vended on demand, a system that disperses and stores unique sequence values closer to the consuming client is described. Unique sequence values are unique identifiers, such as a string of numbers, letters, or other symbols. Additionally, these sequence values may increment such that each value can be tracked relative to each other value. For instance, each unique sequence value may comprise a unique string of numbers, with each subsequent sequence value increasing by some value (e.g. increment by one or two, etc.). Of course, these sequence values may also employ any other sequence that allows the values to be tracked relative to one another. It is also noted that these sequence values may, after their generation, be subject to one or more transformations before being employed by a consuming client.

Additionally, once a sequence value has been generated and vended, this value may be permanently removed from the pool of available sequence values to be generated. Each subsequently generated and vended value may increment upwards such that each subsequently generated and vended value will not collide with a previously generated and vended value.

An embodiment of a system described includes a single master or a ring or multiple masters that receives requests to generate and vend unique sequence values. In the case of a single master, the master fills the request by generating and vending the values downstream towards the consuming clients. In the case of a ring of masters, the master to whom the request was made reaches an agreement with the other masters in the ring before fulfilling the request. That is, each of the masters agrees on a range of values to generate and vend before actually generating and vending such values. Once all of the masters reach agreement, the master to whom the request was made then generates and vends the values downstream towards the client.

Embodiments of the system further include a layer of filling pools, which stores the generated sequence values between the master or masters and the consuming clients. By layering these pools upon one another, the system distributes the requested sequence values throughout a pipeline between the master(s) and the client(s). Additionally, at least one of the filling pools includes, controls, or otherwise has access to both persistent and non-persistent memory for storing the generated sequence values. For instance, the filling pool may store values in a hard drive that is durable, persistent, and non-volatile, while also storing values in Random Access Memory (RAM) that is not durable, not persistent, and is volatile.

The consuming client then receives (e.g., pulls) values from the non-persistent memory of a corresponding filling pool. The filling pool, meanwhile, replenishes the non-persistent memory with sequence values by transferring values from the persistent memory to the non-persistent memory. By serving values from the non-persistent memory to the client, the client can potentially receive values much more quickly than if the filling pools or masters served the values from a persistent memory. Additionally, by distributing the values between both non-persistent and persistent memory in the filling pool layer, at least the values that the persistent memory stores may be recovered upon a crash of one or more components of the system. Therefore, the described system elegantly balances both prompt distributions of values to the clients as well as adequate security to guard against losing entire batches of values should a crash occur.

To replenish the non-persistent memory with values stored in the persistent memory, the filling pool monitors the number of values in the former to determine whether this number is less than a threshold. If so, then the filling pool transfers values. Additionally, the filling pool or another entity may monitor a number of values stored generally in the filling pool or specifically in the non-persistent memory. If this number dips below another threshold, then a request for additional values may be sent to the master. In some instances, the filling pool sends such a request to a remote pool, which in turn communicates the request to the master. The master or masters then generate and vend values in the manner discussed above.

Further, the filling pools or the clients themselves may dynamically track a respective client's consumption of the unique sequence values. Alternatively or additionally, the filling pool may dynamically track an amount of values that all clients pull from the pool. In either instance, the filling pool or the client may then use this information to determine an appropriate number of values that should be stored in the filling pool(s) for safety purposes. Based upon these stored values, the system allows the client to continue pulling values from the filling pool layer for a predetermined amount of time (e.g., hours, days, months, etc.) in the event that one or masters crash or otherwise become unavailable.

For instance, the system may determine that a respective filling pool should maintain enough unique sequence values such that the client or clients that the respective pool supplies can continue serving clients for three days after a master crashes. By tracking consumption of each client, the respective filling pool is able to calculate and maintain the proper amount of values. In addition to distributing values to clients in an efficient manner, the system also perceptively provides time for system operators to remedy problems (e.g., crashes) in the system without disrupting clients' use of the unique sequence values.

These systems for generating and vending unique sequence values may be implemented in a number of ways and in a number of contexts. One example implementation and context is provided with reference to the following figures, as described below in more detail. It is to be appreciated, however, that the following implementation and context is but one of many.

Example Environment and System Architecture

Figure 1:
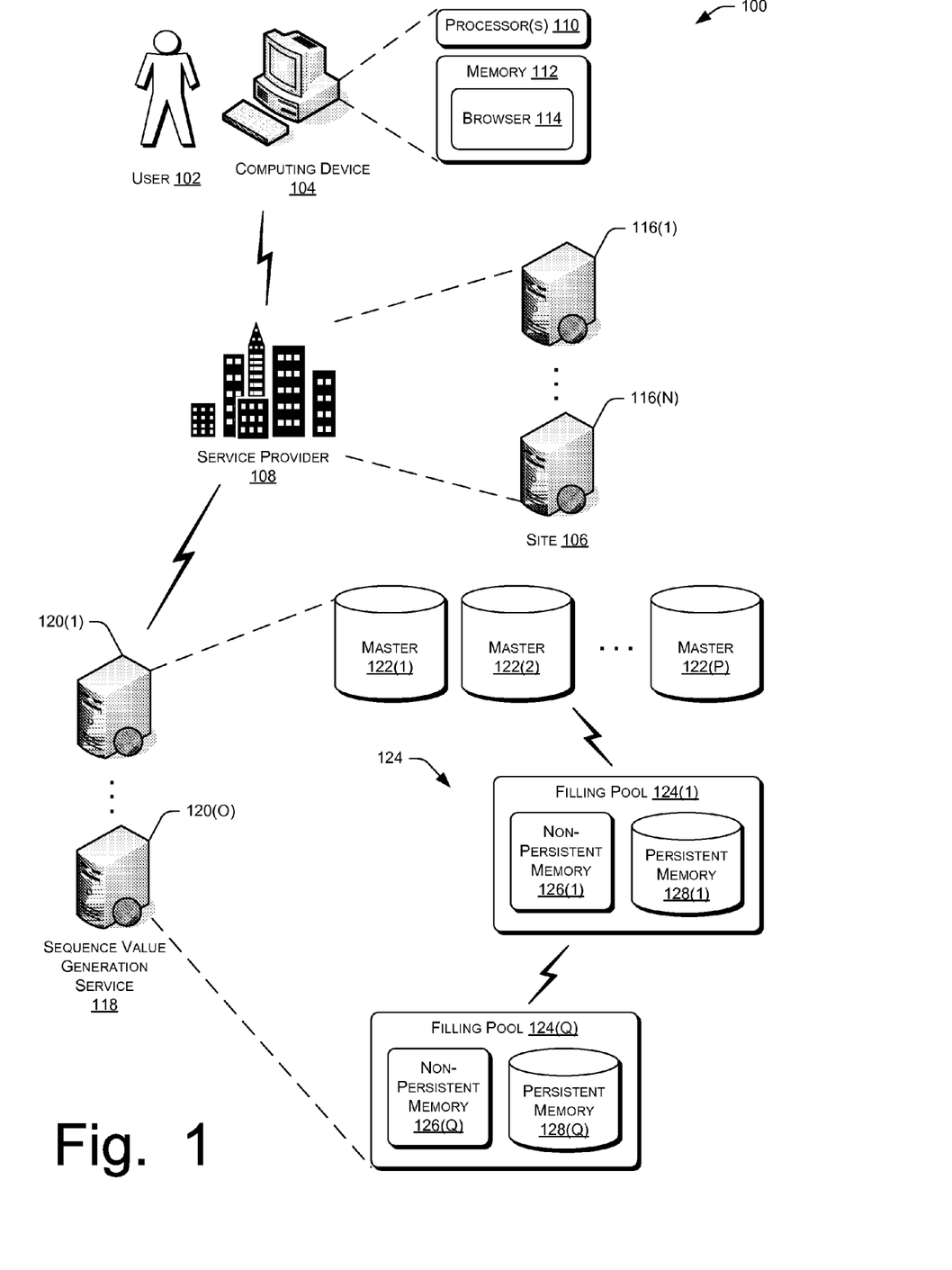
FIG. 1 illustrates an example architecture for efficiently generating and vending unique sequence values. This example illustrates a user operating a computing device to access a site of a service provider, who leverages a sequence value generation service when the user requests a transaction with the service provider.

FIG. 1 illustrates an example architecture 100 in which efficient generation and vending of unique sequence values may be implemented. Here, the techniques are described in the context of customers conducting transactions with a service provider, with the generated and vended values being employed to identify these transactions. For instance, these techniques may be helpful in identifying an order made by a customer of a service provider. It is to be appreciated, however, that the generated and vended values may be employed to identify any other event or record in a vast number of other possible environments that generate and/or use unique identifiers.

In architecture 100, a representative user 102 employs a user computing device 104 to access a representative content site 106 associated with a representative service provider 108. While the illustrated example represents the user 102 accessing the content site 106 of the service provider 108, the described techniques may equally apply in instances where the user 102 interacts with a representative of the service provider 108 in person, over the phone, or the like. Here, the user 102 accesses the content site 106 via a network. The network may include any one or combination of multiple different types of networks, such as cable networks, the Internet, and wireless networks.

The user computing device 104 may be implemented as any number of computing devices, including as a personal computer, a laptop computer, a portable digital assistant (PDA), a cell phone, a set-top box, a game console, and so forth. Each user computing device 104 is equipped with one or more processors 110 and memory 112 to store applications and data. An application, such as browser 114 or other client application, running on the device 104 facilitates access to the site 106 over the network.

The content site 106 is hosted on one or more servers 116(1), . . . , 116(N) having processing and storage capabilities. In one implementation, the servers might be arranged in a cluster or as a server farm, although other server architectures may also be used to host the site. The site is capable of handling requests from many users and serving, in response, various pages of content that can be rendered at the user computing device 104 for viewing by the user 102. The content site 106 is representative of any number of sites, such as websites for e-commerce, news and information, search, entertainment, and so forth. Additionally, the site is representative of proprietary sites that receive requests and provide content over proprietary networks other than the Internet and public web.

In the illustrated example, the site 106 serves content as pages that can be rendered by the browser application 114 running on the user computing device 104. These pages may include e-commerce pages, news and information pages, search pages, entertainment pages, or any other assortment of pages offered by traditional sites. Here, the site 106 serves a page that allows the user 102 to request to conduct a transaction with the service provider 108 via the user computing device 104. For instance, the site 106 may serve a page that displays details about an item for sale by the service provider 108 or another party. In addition to providing details about the item, the served page may also allow the user 102 to request to purchase the illustrated item.

When the user 102 makes such a request, a unique identifier in the form of a unique sequence value may be assigned to the user's order. With use of the assigned value, the service provider 108 may track the customer's order from the user's request to purchase through fulfillment of the purchase. Additionally, the service provider 108 may store the unique sequence value along with details of the customer order in a database for future analysis, sorting, or for many other purposes.

In some architectures, the service provider 108 may itself generate the unique sequence values. In other architectures, the provider 108 may utilize an external sequence value generation service 118 to generate the unique sequence values.

The sequence value generation service 118 functions to generate and/or vend unique sequence values for use in identifying events such as the illustrated user's previously-described purchase. This service may be integral with the service provider, or may comprise a web service that functions to generate and vend values in all types of contexts.

FIG. 1 illustrates that the sequence value generation service 118 includes one or more servers 120(1), . . . , 120(N) having processing and storage capabilities. While FIG. 1 illustrates the sequence value generation service 118 and its servers 120(1)-(O) as a single entity, it is to be appreciated that the described functionality of the service 118 may be spread amongst multiple entities (e.g., the service provider 108, a dedicated web service, etc.) and/or across multiple networks.

Whatever the architecture of the sequence value generation service 118, the service 118 functions to generate and vend unique sequence values for consuming clients. The service 118 also stores these generated values downstream closer to the clients in multiple areas, including both persistent and non-persistent memories. As illustrated, the sequence value generation service 118 includes either a single standalone master (e.g., a master 122(1)) or a ring of multiple (e.g., masters 122(1), (2), . . . , (P)). In the case of multiple masters, system administrators may choose to locate each of the masters remotely from one another to avoid the loss of multiple masters due to a catastrophic event at a particular geographic location. Whether a standalone or ring of masters is implemented, the master(s) function to generate the unique sequence values in response to a request originating from a consuming client. The masters 122(1)-(P) additionally store these values in memory (e.g., a non-volatile, persistent memory) until the values are passed downstream.

As FIG. 1 further illustrates, the masters 122(1)-(P) couple (e.g., directly, over a network, etc.) to a layer 124 of one or more filling pools 124(1), . . . , (Q). The filling pools 124(1)-(Q) function to receive generated sequence values from the masters 122(1)-(P) and store the values for use by consuming clients. The consuming clients may include any applications that need to associate unique sequence values to an event or record. For instance, one client may be an application associated with the service provider 108 that identifies and tracks customer orders made by customers such as the user 102.

Some or all of the filling pools 124(1)-(Q) may include a cache (e.g., an in-memory cache) and a source. The cache and the source may be integral with or accessible by a respective filling pool. Here, the cache of the filling pool 124(1) comprises a non-persistent memory 126(1) (e.g., RAM), while the source comprises a persistent memory 128(1) (e.g., a persistent and durable hard drive). Similarly, the cache and the source of the filling pool 124(Q) comprise a non-persistent memory 126(Q) and a persistent memory 128(Q), respectively. Additionally, in some instances a cache of a filling pool comprises another filling pool.

Before vending the unique sequence values to consuming clients, some or all of the filling pools 124(1)-(Q) store some of the generated sequence values in the non-persistent memories 126(1)-(Q) and some of the generated sequence values in the persistent memories 128(1)-(Q). More specifically, the filling pools 124(1)-(Q) first store values in the non-persistent memories 126(1)-(Q) and, once the non-persistent memories 126(1)-(Q) are full or have reached a predefined threshold, in the persistent memories 128(1)-(Q). The filling pools 124(1)-(Q) may then vend values, upon request, to the requesting client(s) from the non-persistent memory 126(Q) of the respective filling pool 124(Q).

In some embodiments, a background thread monitors an amount of values in one or more of the non-persistent memories. Once an amount of values stored within the respective non-persistent memory falls below a threshold, the background thread then transfers values from a persistent memory (e.g., the persistent memory 128(Q)) to a non-persistent memory (e.g., the non-persistent memory 126(Q)). Because these embodiments employ a background thread to monitor the non-persistent memory and to transfer these values, whoever is calling into the non-persistent memory is unaware of the process to the fill the non-persistent memory. Instead, the caller can merely assume that the non-persistent memory will have sufficient values to satisfy a given request. Additionally, the background thread ensures that the caller will rarely if ever be blocked in response to the caller's request for values from the non-persistent memory.

Similarly, once the persistent memory 128(Q) of the filling pool 124(Q) empties or falls below a threshold amount of values, the respective filling pool 124(Q) or another actor may request that the filling pool 124(Q) be replenished. The filling pool or the other actor may make such a request upstream to another filling pool, such as the filling pool 124(1), or to one or more of the masters 122(1)-(P). The values are then generated and/or vended downstream through one or more filling pools to the respective requesting filling pool 124(Q).

Because the sequence value generation service 118 pushes values downstream nearer the clients via the filling pools, and because the generation service 118 serves values to clients via the non-persistent memories 126(1)-(Q), a unique identifier is assigned much more quickly to customer orders or other database records. In the illustrated example, when the user 102 requests to purchase the item the delay to the user 102 is greatly reduced or eliminated.

Additionally, the layer 124 of filling pools 124(1)-(Q) acts in a cascading manner to not only push the unique sequence values closer to the consuming client, but also to distribute these values throughout the pipeline between the masters 122(1)-(P) and the consuming clients. This approach, coupled with the filling pools' utilization of both persistent and non-persistent memories, results in a system that is relatively safe in addition to its established efficiency. That is, if a master crashes or otherwise becomes unavailable, the consuming clients may continue to request values for as long as values remain within the layer 124 of the filling pools 124(1)-(Q). Additionally, should one or more of the filling pools 124(1)-(Q) crash or otherwise become unavailable, only those values stored within the non-persistent memories 126(1)-(Q) will likely be lost. The values within the persistent memory 128(1)-(Q) will likely be recovered, as they were durably written to the respective memory.

In some embodiments, the illustrated configuration allows a client to request any number of unique sequence values without having to send such a request across a network and back to an original source of the unique sequence values. The illustrated configuration thus provides a system for providing unique sequence values to consuming clients in a manner that can, among other potential benefits, drastically reduce or eliminate the latency traditionally associated with requesting such values. Finally, it is noted that while one example configuration is shown, the sequence value generation service 118 may take the form of multiple other configurations that include similar or different components and/or yield similar or different results.

Example Filling Pool Layer

Figure 2:
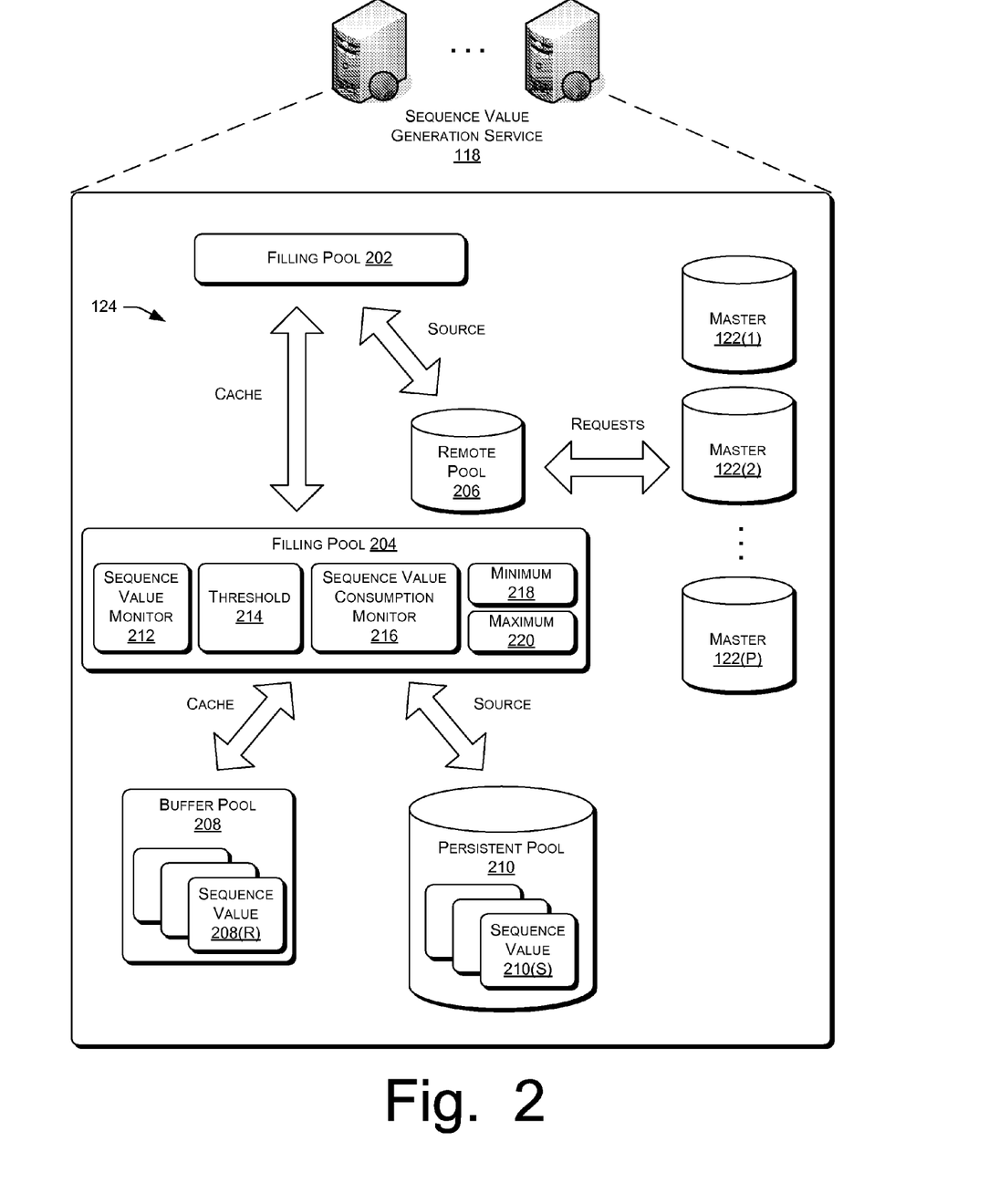
FIG. 2 is a block diagram illustrating selected modules in the sequence value generation service of FIG. 1. Specifically, this block diagram shows an example architecture of a filling pool layer of the sequence value generation service.

FIG. 2 illustrates an example implementation of the sequence value generation service 118 and, more specifically, an example implementation of the filling pool layer 124. The filling pool layer 124 may be located on a single server or may be distributed across multiple networked servers.

The filling pool layer 124 is shown here to couple to the masters 122(1)-(P), which generate unique sequence values and vend the values to the filling pool layer 124 as discussed above. The filling pool layer 124 includes a first filling pool 202 and a second filling pool 204. Other filling pool layer implementations may include other filling pools serially connected to the filling pools 202 and 204. Additionally, other implementations of the sequence value generation service 118 may include additional filling pool layers that are parallel to the illustrated filling pool layer 124.

Each of the illustrated filling pools 202 and 204 include a cache and a source. The cache of the first filling pool 202 here comprises the second filling pool 204 itself. The source of the first filling pool 202, meanwhile, here comprises a remote pool 206. The remote pool 206 functions to request (and potentially receive) an additional batch of sequence values when the filling pool layer 124 or a filling pool therein empties of values or reaches a minimum threshold. In addition to the illustrated components of the first filling pool 202, the first filling pool 202 may also itself store unique sequence values in persistent and/or non-persistent memory.

The cache of the second filling pool 204 comprises a buffer pool 208. Buffer pool 208 is a non-persistent memory that stores one or more unique sequence values 208(1)-(R), as previously generated and vended by one or more of the masters 122(1)-(P). The source of the filling pool, meanwhile, here comprises a persistent pool 210. As its name suggests, the persistent pool 210 is a persistent memory that stores one or more unique sequence values 210(1)-(S), also previously generated and vended by one or more of the masters 122(1)-(P).

The second filling pool 204 also includes a sequence value monitor 212, which may also reside in the first filling pool 202, both filling pools, or in another location. The sequence value monitor 212 monitors an amount of sequence values within the filling pool 204 generally, as well as amounts of values within the buffer pool 208 and the persistent pool 210.

When a client requests one or more sequence values from the sequence value generation service 118, one or more sequence values from the buffer pool 208 are provided to the client. By providing the client with values from a non-persistent memory, the client is quickly served the values. When the sequence value monitor 212 detects that the amount of the sequence values 208(1)-(R) drops below a predetermined threshold 214, the filling pool 204 transfers sequence values from the persistent pool 210 to the buffer pool 208. As such, the filling pool 204 maintains sequence values in the buffer pool 208 to quickly and efficiently serve the values to a consuming client.

Additionally, the filling pool 204 includes a sequence value consumption monitor 216. The sequence value consumption monitor 216 measures the rate of consumption of unique sequence values from the pool. If the sequence value consumption monitor 216 anticipates a need for more values, the filling pool may accordingly request these additional values via the first filling pool 202. For instance, the monitor 216 may periodically, randomly, or continually compute a rolling average of vended values for a specified time period (e.g., seven days). In the seven-day time period example, the monitor 216 periodically computes the average volume of requests over the past seven days. With this information, the filling pool 204 may anticipate a need to request additional sequence values if the computed average volume shows a marked increase.

The filling pool 204 also maintains respective indications of a minimum 218 and a maximum 220 number of sequence values that the filling pool 204 should store. This minimum and maximum may be measured either in terms of raw numbers or time. In the latter instance, the filling pool 204 leverages its knowledge of the rate of consumption (provided by the monitor 216) coupled with its knowledge of a number of currently-stored sequence values to determine if the minimum is met or if the maximum is exceeded. An example minimum may require that the filling pool have at least five days worth of values. If the number of sequence values stored in the filling pool becomes less than or near the minimum 218, the filling pool 204 may request additional values. If the ring of masters 122(1)-(P) is unavailable to service the request, and the request is therefore denied, an error may be logged.

Conversely, if the number of sequence values stored in the filling pool becomes greater than or near the maximum 220, the filling pool 204 may pass sequence values upwards to the first filling pool 202. The first filling pool 202 may then pass these values to the remote pool 206, which in turn may return these values to one of the masters 122(1)-(P) for storage.

When the second filling pool 204 requests additional sequence values via the first filling pool 202, the first filling pool 202 sends the request to its source, which here comprises the remote pool 206. The remote pool 206 then sends the request directly to one or more of the masters 122(1)-(P). To do so, the remote pool 206 contains or has access to a list of some or all of the masters 122(1)-(P). The first master on the list is considered primary to the remote pool 206. The remote pool 206 then sends a request to the primary host and, if the communication is unsuccessful, moves downwards on the list until a successful communication is reached with a master. If the remote pool 206 cannot reach a master, then an error is logged.

Figure 3:
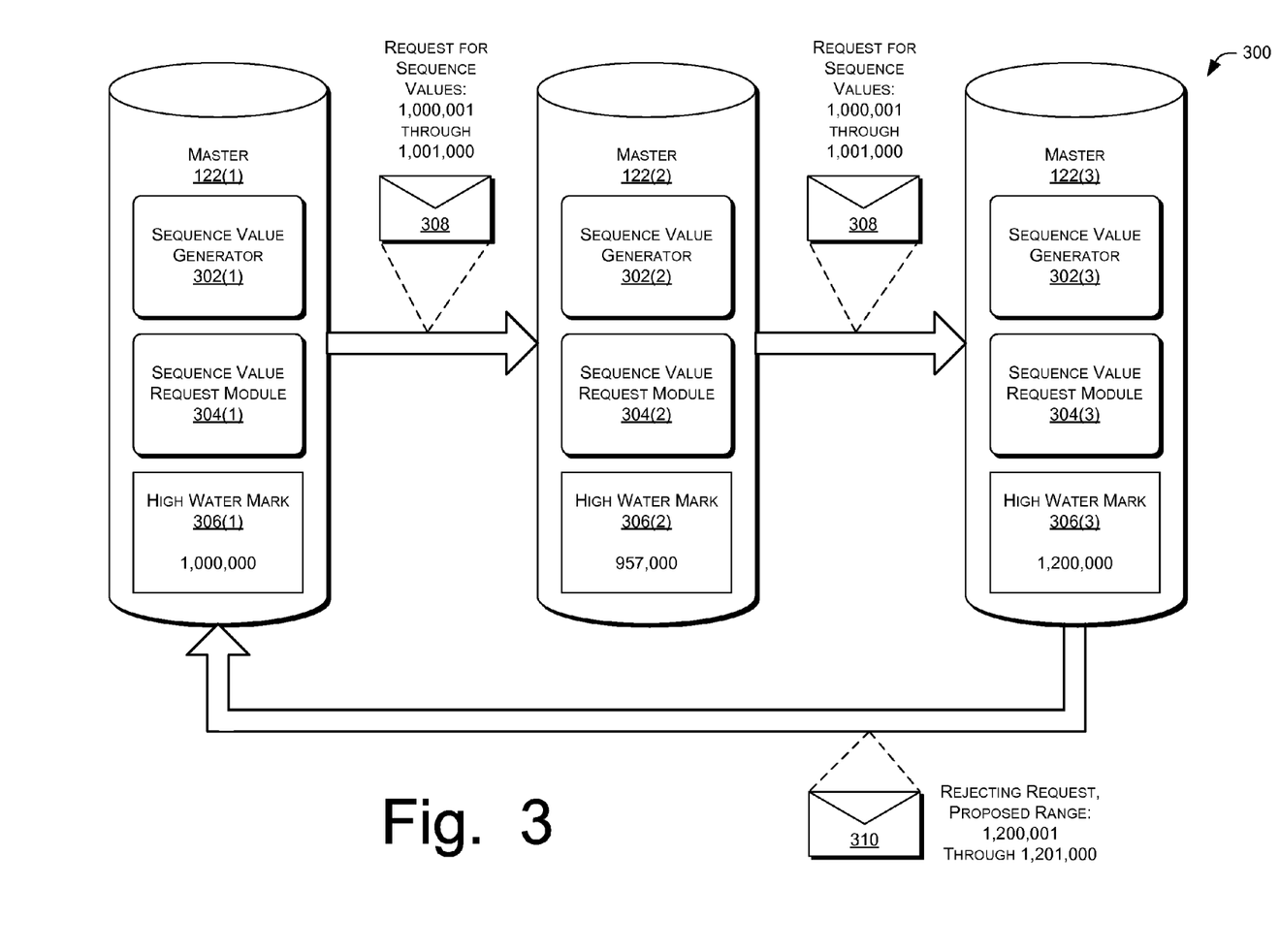
FIGS. 3-4 are functional flow diagrams illustrating selected modules of a ring of masters of the sequence value generation service as a first master requests to generate and vend a batch of unique sequence values.
Figure 4:
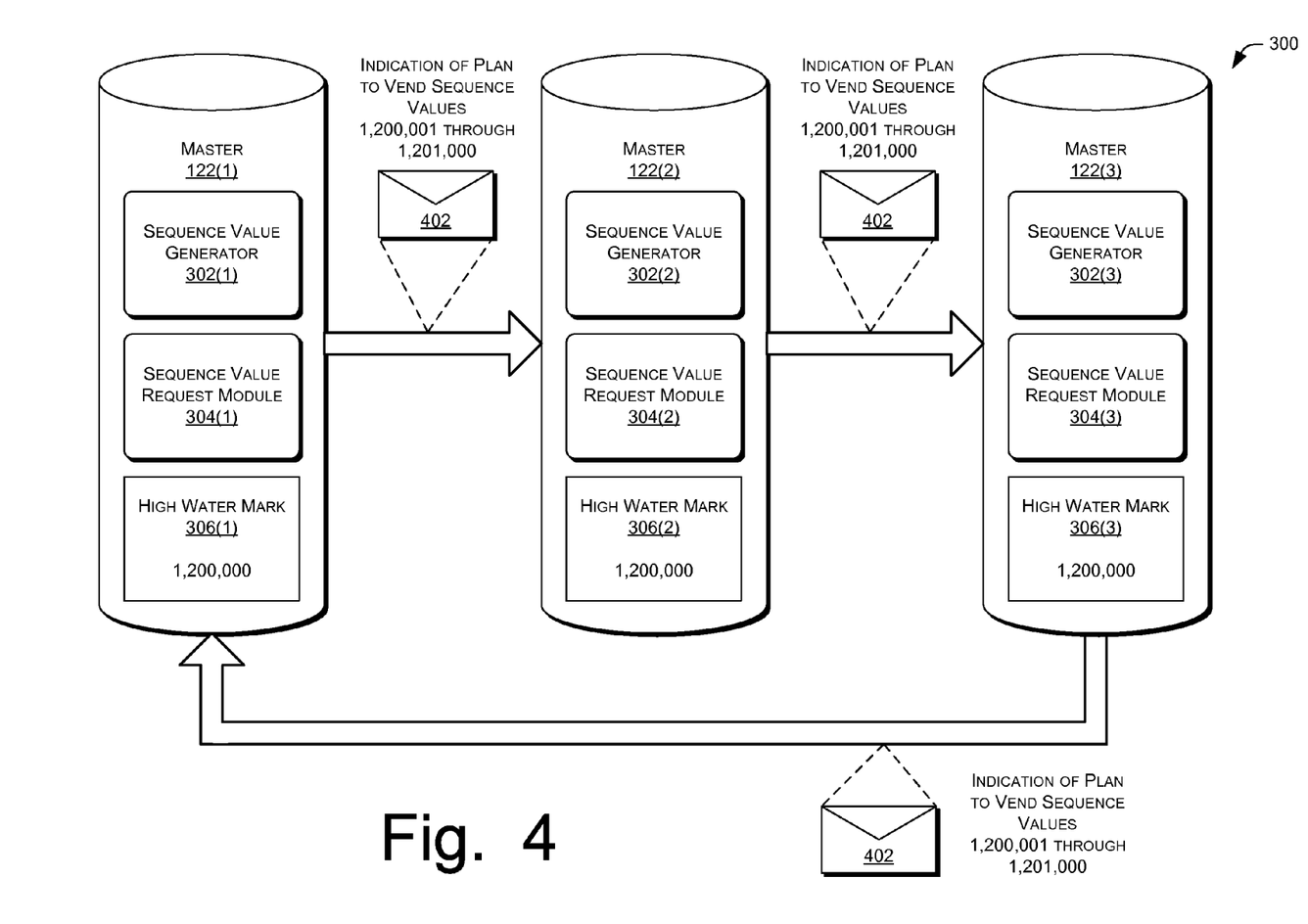

Without regard to which master the remote pool 206 successfully contacts, the ring of masters 122(1)-(P) then agree on a particular range of values to serve in response to the request. FIGS. 3-4 describe an example of this process in detail. Once the masters 122(1)-(P) have reached an agreement, the masters 122(1)-(P) generate and vend the sequence values back to the remote pool 206. The first filling pool 202 is then able to pull the values from its source, the remote pool 206, and provide these values downstream towards the client. The second filling pool 204 receives the values from the first filling pool 202 and stores these values either in the buffer pool 208, the persistent pool 210, or some combination thereof. In either instance, the second filling pool 204 will generally ensure that adequate values remain in the buffer pool 208 for service future requests made consuming clients.

In some embodiments, the filling pool 204 first attempts to store the received values in the buffer pool 208 until the buffer pool 208 fills. At this point, the filling pool 204 attempts to store the remaining values in its source, the persistent pool 210. Similarly, if the buffer pool 208 rejects the values or if the attempt to store values in the buffer pool 208 times out, then the filling pool 204 stores the values in the persistent pool 210. However, in the latter instances where the buffer pool 208 rejects the values or the attempt to store the values times out, the values may be rejected and discarded rather than stored in the persistent pool 210. By discarding these values, the likelihood of generating and vending duplicate values decreases.

In addition to pushing values downstream towards the consuming clients, the filling pool layer 124 may similarly push values upstream during a graceful shutdown of the system in some embodiments. For instance, if system administrators take down some or all of the filling pools in the filling pool layer 124, the second filling pool 204 transfers values stored therein upwards to the first filling pool 202. The first filling pool 202 then transfers these values to its source, the remote pool 206, which then transfers the values back up one or more of the masters 122(1)-(3). At this point, the system administrators may gracefully shut down the system without deleting or wasting the values that the filling pool layer 124 previously stored. Once the administrators restore the system, the stored values may again be pushed downwards from the masters 122(1)-(P) and to the filling pools 202 and 204.

However, while some embodiments may transfer values upwards, other embodiments may not. Instead, these latter embodiments may discard stored values during a graceful or non-graceful shutdown of the system in order to avoid the generation and vending of duplicated values. That is, these embodiments put a greater emphasis of ensuring unique values as opposed to saving previously generated but not yet vended values.

While the current example implementation illustrates two filling pools having multiple components, it is to be appreciated that other implementations may include any other number of filling pools having similar or different configurations than the illustrated pools.

Example Master Ring and Process

FIGS. 3-4 represent a functional flow diagram 300 illustrating selected modules of the ring of masters of the sequence value generation service 118 as a first master 122(1) requests creation of a batch of unique sequence values. The flow diagram 300 illustrates three masters 122(1), (2), and (3), although other implementations may employ any other number of masters. Additionally, system administrators may add or remove masters within a particular ring, or may entirely replace a ring with a new ring of masters. In the current example, each of the three illustrated masters includes a sequence value generator 302(1), . . . , (3) and a sequence value request module 304(1), . . . (3). Each of the sequence value generators 302(1)-(3) functions to generate the unique sequence values. Here, these sequence values comprise unique numbers that increment by one. Once one of the sequence value generators 302(1)-(3) generates the sequence values, the corresponding master stores the values in persistent and/or non-persistent, either locally or remotely, until the sequence values are vended. The sequence value request modules 304(1)-(3), meanwhile, receive requests from the remote pool 206 and other remote pools. In response to a request, the ring of masters begins a process to decide upon a range of values to generate and vend. By agreeing on a range of values, the masters ensure that each generated and vended sequence value is indeed unique. To reach an agreement on a range of values, some embodiments employ a "two-pass" process. The first pass ensures that the masters agree on a range of values to vend. The second pass, meanwhile, ensures the agreed-upon range of values have not been consumed during or after the first pass. If the second pass is successful, then the initiating master will generate and vend the agreed-upon range of values.

Additionally, because the ring of masters 122(1)-(3), in some embodiments, generates incrementing and consecutive values, the need to interleave the values between individual masters is eliminated. Interleaving refers to a process for ensuring that values generated by a first source do not collide with values generated by a second source (or third source, fourth source, and so on). For instance, in systems that employ forty sources, a first source may vend values according to the following sequence: 1, 41, 81, etc. A second source, meanwhile, may vend values according to this sequence: 2, 42, 82, etc. Because the illustrated ring of masters 122(1)-(3) agree on a range of values before vending values, however, the operational burden associated with this interleaving process may be eliminated. Of course, it is to be appreciated that other implementations may employ multiple separate rings of masters, in which case interleaving amongst the rings is reduced rather than entirely eliminated.

In the two-pass process, the master that receives a request for values may first send a request or suggestion to vend a particular range of sequence values. This "first pass" is sent sequentially throughout the ring, with each master in the ring deciding whether to approve the request or whether to suggest a new range. When the request or other suggestion returns to the original requesting master, the requesting master determines whether to modify the range that it wishes to generate or whether to preserve the original range. At this point, the original requesting master then sends an indication along the ring to each master. This indication notifies each master that the original requesting master will generate and vend the referenced range of sequence values unless one or more masters reject the request. When the indication returns to the original requesting master after this "second pass", the master either generates the sequence values or, if a master denied the request, an exception is thrown.

To exemplify, the master 122(1) of FIG. 3 receives a request from the remote pool 206 to generate and vend 1,000 unique sequence values. In response, the master 122(1) first determines its own high water mark 306(1). The high water mark 306(1) represents a highest numbered sequence value that the master 122(1) believes it or another of the masters 122(2)-(3) has ever served. The master 122(1), as well as the other masters 122(2)-(3), maintains the high water mark 306(1) via a locally persisted counter.

In the current example, the higher water mark 306(1) of the master 122(1) is 1,000,000. Therefore, the master 122(1) initiates a message 308, that includes a message identification, requesting to generate and vend a range of 1,000 sequence values beginning with a value that is one greater than the high water mark 306(1). As illustrated, the message 308 suggests a range of sequence values from 1,000,001 to 1,001,000.

The master 122(1) then sends the message 308 along with the identification of the message to the second master 122(2). Upon receipt, the second master 122(2) compares the requested range of sequence values with a high water mark 306(2) of the second master 122(2). In the current example, this master 122(2) determines that its high water mark is 957,000 and therefore recognizes that it should update its high water mark 306(2). The master 122(2) accordingly updates the high water mark 306(2) to 1,000,000 and, because its own high water mark was lower than the high water mark 306(1) of the first master 122(1), passes the message 308 and the message identification along to the third master 122(3).

Upon receipt of the message 308, the third master 122(3) checks a high water mark 306(3) of the third master 122(3). Here, the high water mark 306(3) is higher than that of the beginning of the range of the requested sequence values. Namely, the high water mark 306(3) of the third master 122(3) is 1,200,000. Without regard to whether or not this highest high water mark 306(3) is correct, the master 122(3) rejects the request and suggests a new range of sequence values for generation and vending. Because the illustrated system places a premium on unique and non-colliding sequence values, it can be a best practice to adopt the highest high water mark of all of the masters in order to avoid the possibility of colliding values, even at the expense of creating a gap in the generated and vended sequence values.

After checking the high water mark 306(3), the master 122(3) suggests a range of sequence values that begins with a value that is one greater than the high water mark 306(3). The master 306(3) therefore sends a message 310 that rejects the original master's request and proposes a new range of 1,200,001 through 1,201,000. This message 310 also includes the message identification of the original message 308.

When the first master 122(1) receives the message 310 and the original message identification, the master 122(1) recognizes the message identification and realizes that the originally proposed range has been replaced with a new range. Additionally, the master 122(1) determines that the high water mark 306(1) is out of date and the master accordingly updates the high water mark to 1,200,000. After this first pass, each of the high water marks 306(1)-(3) may be synchronized with one another. Because each master 122(1)-(3) maintains a high water mark 306(1)-(3) that may be synchronized, in the event that a master (or masters) goes down, that master may, upon repair, consult with a master that did not go down in order to determine the current high water mark. For instance, if the master 122(1) goes down, when the master 122(1) is repaired and put back into service the master 122(1) may consult with either or both of the other masters 122(2)-(3) to determine the appropriate high water mark.

In some instances, when a faulty master of the ring of masters 306(1)-(3) is replaced, a repair process may initiate upon any startup or restart of the master process. During this repair-upon-startup process, the ring of masters 306(1)-(3) engages in a "first pass", as illustrated and described with reference to FIG. 3. This first pass synchronizes each high water mark of the masters. This process thus ensures that each master of the ring of masters 306(1)-(3) is in sync relatively soon after the replacement of the faulty master. If, for some reason, the synchronization process does not succeed, an error may be logged. In these instances, a system administrator may need to take action to solve the problem.

In addition to repairing faulty masters upon startup, this process also allows system administrators to change master configurations with very little downtime. For instance, a master may be added to a ring of masters and, upon startup, each of the masters (including the new master) will synchronize with one another. The new master is thus ready to generate and vend unique sequence values relatively shortly after being added to the ring of masters.

FIG. 4 continues the functional flow diagram 300 of FIG. 3. Having completed the first pass of FIG. 3, each of the high water marks 306(1)-(3) have been updated to reflect the highest of the high water marks (i.e., 1,200,000). The master 122(1) then sends a message 402 indicating to each of the other masters 122(2)-(3) that the first master 122(1) intends to generate and vend the specified range of unique sequence values (1,200,001 through 1,201,000) absent disapproval from one of the other masters 122(2)-(3). This second pass therefore gives the other masters 122(2)-(3) a final opportunity to prevent the generation of the values. The message 402 may, similar to message 308, include a message identification to allow the master 122(1) to recognize when a corresponding message is received from another master of the ring of masters 122(1)-(3).

FIG. 4 illustrates that the master 122(1) that wishes to generate and vend the values creates and sends a message 402 to the second master 122(2) in the ring. The message 402 indicates to the second and subsequent masters that the first master 122(1) intends to generate and vend a specified range of sequence values, unless one or more masters object. One of the other masters 122(2)-(3) may object, for instance, if the objecting master has generated and vended values between the first and second passes illustrated by FIGS. 3-4. Similarly, one of the other masters 122(2)-(3) may object if the objecting master has begun a first pass of its own, requesting to generate and vend a sequence of values that conflicts the sequence that the first master 122(1) currently intends to generate and vend (i.e., 1,200,001 through 1,201,000).

When a master objects during a second pass, such as the second pass illustrated by FIG. 4, an error is thrown and the masters enter optimistic lock failure. When this occurs, the process returns to the first pass to agree upon a range of values. If the ring of masters 122(1)-(3) loop between the first and second passes a predefined number of times or for a predefined amount of time, then a monitor may detect the problem. At this point, a system administrator may attempt to remedy the problem.

In order to avoid frequent occurrence of optimistic lock failure, a system's ring of masters may include relatively few masters that vie for unique sequence values. Nevertheless, should the ring of masters go down and an optimistic lock failure occur, the unique sequence values stored throughout the filling pool layer 124 should provide enough values to allow for the masters to be serviced and restored without impeding client consumption of the values for a certain predetermined time period. That is, the filling pool layer 124 should enable clients to continue operations as normal until system administrators restore the masters 122(1)-(3).

In the illustrated example, however, the second master 122(2) has not attempted to generate or vend values since the illustrated first pass of FIG. 3. Further, the second master 122(2) has updated its high water mark 306(2) to the current level. The second master 122(2) therefore passes the message 402 along to the third master 122(3).

The third master 122(3) similarly fails to object to the indication of the first master 122(1) and therefore passes the message 402 to the next master in the ring. Here, the next master in the ring is the first master 122(1). When the first master 122(1) receives the message 402, the first master 122(1) recognizes that no masters have objected to the indication carried by the message 402. The first master 122(1) therefore generates unique sequence values 1,200,001 through 1,201,000 and distributes them downstream into the filling pool layer 124 and closer to the consuming clients.

In lieu of the ring configuration illustrated by FIGS. 3-4, other implementations may employ a central trusted database in addition to the masters 122(1)-(3). In this configuration, a master that requests to generate and vend values communicates the request to the central trusted database rather than the other masters. The central trusted database then either confers with the other masters or makes an internal determination as to whether or not the requested values are available. In the latter instances, the central trusted database maintains a list of all unique sequence values that the masters 122(1)-(3) have previously vended. The central trusted database may grant permission to the requesting master or may suggest a new range of values.

Finally, it is noted that in some implementations, the central trusted database may be added or removed with very little downtime. In the instance of adding a central trusted database to an existing ring of masters, the database and the ring of masters may each sync with one another upon restart of the master process. Similarly, if system administrators choose to remove the central trusted database, the ring of masters may sync with one another upon the restart process. In either instance, these implementations allow system administrators to alter the master configurations without significant downtime.

Operation

Figure 5:
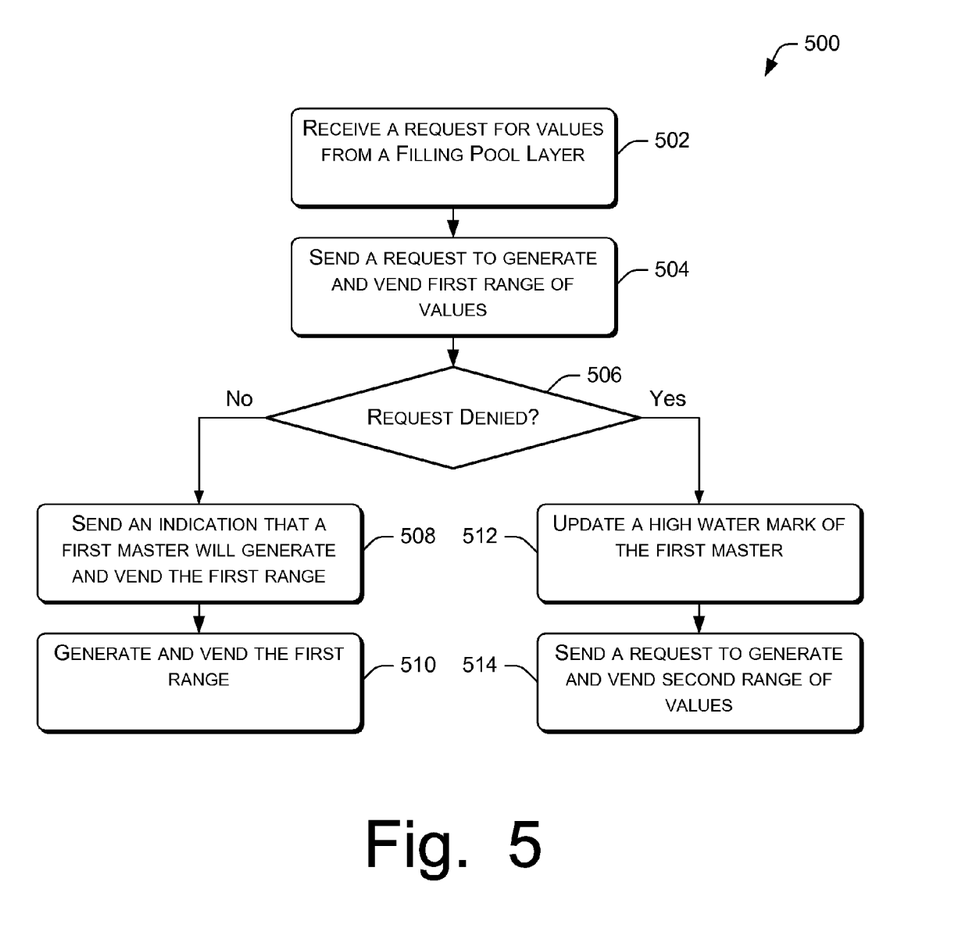
FIG. 5 is a flow diagram of an example process for efficiently generating and vending a batch of unique sequence values.

FIG. 5 illustrates an example process 500 for efficiently generating and vending a batch of unique sequence values.

Figure 6:
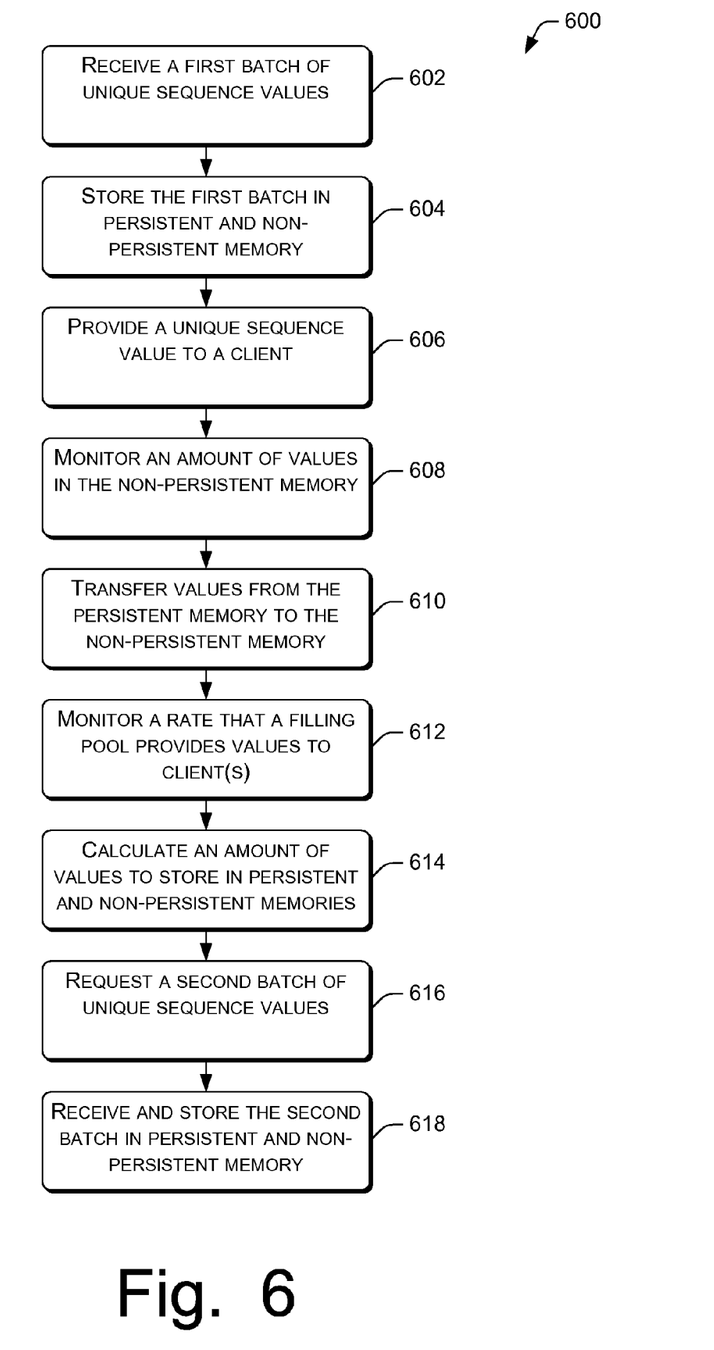
FIG. 6 is a flow diagram of an example process for receiving a batch of unique sequence values from a master, storing the values in both persistent and non-persistent memory, and providing the values to clients upon request.

FIG. 6 illustrates an example process for receiving a batch of unique sequence value from a master, storing the values in both persistent and non-persistent memory, and providing the value to clients upon request. These processes are each illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the process is described with reference to the architecture 100 of FIG. 1. In particular, many acts described below may be implemented and performed by the masters 122(1)-(P) shown in FIGS. 1 and 3-4, as well as by the filling pool layer 124 shown in FIGS. 1 and 2.

The process 500 includes operation 502, which represents receiving a request for unique sequence values from a filling pool layer, such as the filling pool layer 124. In response, operation 504 sends a request, from a first master of the ring of masters 122(1)-(P) and to a second master, to generate and vend a first range of unique sequence values. The first value in this range likely corresponds to a value that is one greater than the high water mark of the first master.

At decision block 506 a determination is made of whether the second or a subsequent master has denied the request of operation 504. If no denial is received, then process 500 continues to operation 508. This operation represents that the first master sends an indication to the second master informing the second master that the first master will proceed to generating and vending the first range of values, absent an objection from one of the masters of the ring of masters. The sent indication is passed along each master in the ring until either the indication or an objection returns to the first master. At operation 510, the first master accordingly generates and vends the first range of values to the filling pool layer, having not received an objection from another master in the current example.

If, however, at decision block 506 it is determined that a denial of the original request has been received, then process 500 continues to operation 512. Here, the first master updates its own high water mark, likely to the highest high water mark of the other masters. At operation 514, the first master sends a request to generate a second range of unique sequence values to the second master. Again, this second range likely begins with a value that is one greater than the updated high water mark of the first master.

FIG. 6 illustrates process 600 for receiving unique sequence values and providing these values to consuming clients. The process 600 includes operation 602, which represents receiving a first batch of unique sequence values. The filling pool layer 124 may receive this first batch from a master of the ring of master 122(1)-(P). The filling pool layer 124 then stores a portion of these values in a persistent memory of a filling pool and another portion of these values in a non-persistent memory of a filling pool at operation 604. Operation 606 then provides a unique value to a client, possibly from the non-persistent memory. By providing a value from the non-persistent memory, the latency between the client's request and the client's receipt of the value is greatly reduced.

Process 600 continues to operation 608, at which point a filling pool or other entity monitors an amount of values stored in the non-persistent memory. If this amount dips below a threshold amount, then operation 610 transfers values from the persistent memory to the non-persistent memory. Operation 612, meanwhile, monitors a rate at which a filling pool is providing values to a client, possibly over a particular time period such as the last seven days. Based on this monitored rate, operation 614 calculates an amount of values to store in the persistent and non-persistent memories. By calculating these amounts, the filling pool may request an appropriate amount of values such that the consuming clients of the filling pool would be served for a predetermined amount of time (e.g., five days) should the ring of masters become unavailable.

At operation 616, a filling pool or the filling pool layer 124 requests a second batch of unique sequence values. Operation 618 then receives this second value in response to the request, and stores the second batch in both persistent and non-persistent memory.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for vending unique sequence values for use in creating customer order identifications, the system comprising:
   at least one computing device configured to implement one or more services, wherein the one or more services provide:
   a ring of multiple masters, individual ones of the masters to generate the unique sequence values for use in the customer order identifications and store the unique sequence values in a persistent memory of individual ones of the masters, the unique sequence values being generated utilizing a two-pass process whereby a first pass includes ensuring that individual ones of the masters agree on a batch of unique sequence values to be vended and a second pass includes confirming that the batch of unique sequence values has not been consumed during and after the first pass; and
   a layer of multiple filling pools to receive the batch of unique sequence values from a master of the ring of multiple masters after the two-pass process is complete, at least one of the filling pools comprising a persistent memory and a non-persistent memory and being configured to:
   provide a unique sequence value stored in the non-persistent memory of the filling pool to a client, responsive to the client requesting a unique sequence value; and
   monitor an amount of unique sequence values stored in the non-persistent memory of the filling pool and, if the amount of unique sequence values stored in the non-persistent memory of the filling pool falls below a threshold amount, transfer unique sequence values from the persistent memory of the filling pool to the non-persistent memory of the filling pool.

2. A system as recited in claim 1, wherein the client employs a unique sequence value of the batch of unique sequence values to identify a transaction between a user of a service provider and the service provider.

3. A system as recited in claim 1, wherein the batch of unique sequence values is a first batch of unique sequence values, and wherein the layer of multiple filling pool comprises a remote pool to request a second batch of unique sequence values from another master of the ring of multiple masters.

4. A system as recited in claim 1, wherein the layer of multiple filling pools comprises a remote pool to request the batch of unique sequence values from a master of the ring of multiple masters and receive the batch of unique sequence values from another master of the ring of multiple masters in response to the request, and wherein the layer of multiple filling pools distributes the received batch of unique sequence values throughout the multiple filling pools.

5. A system comprising:
one or more hardware processors;
a first filling pool comprising a first cache and a first source, the first cache comprising a memory accessible by at least one of the one or more hardware processors to store unique sequence values for a second filling pool and the first source comprising a remote pool to request additional unique sequence values from a master that generates and vends the unique sequence values
the second filling pool comprising:
a second cache comprising a non-persistent memory accessible by at least one of the one or more hardware processors to store unique sequence values for use by a client,
a second source comprising a persistent memory to store the unique sequence values for use by the second cache, and
a sequence value monitor to monitor an amount of the unique sequence value stored in the second cache, and in response to determining that the amount of the unique value sequences stored in the second cache is less than a threshold amount, cause at least one unique sequence value stored in the second source to be transferred to the second cache; and
the second filling pool maintaining a sufficient number of the unique sequence values to provide to the client for at least a predetermined amount of time.

6. A system as recited in claim 5, wherein the second filling pool further comprises a sequence value consumption monitor to monitor a rate that the second filling pool is vending unique sequence values to one or more clients.

7. A system as recited in claim 5, wherein the second filling pool is configured to request additional unique sequence values from the first filling pool when an amount of unique sequence values stored in the second filling pool becomes less than a predefined minimum amount.

8. A system as recited in claim 5, wherein the non-persistent memory comprises a first non-persistent memory and the persistent memory comprises a first persistent memory, and further comprising a third filling pool comprising a third cache and a third source, the third cache comprising a second non-persistent memory to store unique sequence values for use by the client or by the second filling pool and the third source comprising a second persistent memory to store unique sequence values for use by the second non-persistent memory.

9. One or more non-transitory-computer-readable media storing computer-executable instructions that, when executed on one or more processors, perform acts comprising:
sending, from a first master configured to generate and vend unique sequence values and to a second master also configured to generate and vend unique sequence values, a request to generate and vend a first range of unique sequence values corresponding to a high water mark of the first master;
if a denial of the request is received from the second master or another master, then:
updating the high water mark of the first master; and
sending, from the first master and to the second master, a request to generate and vend a second range of unique sequence values that is based at least in part on the updated high water mark of the first master;
if a denial of the request is not received from the second master or another master, then sending, from the first master and to the second master, an indication that first master will generate and vend the first range of unique sequence values to a downstream filling pool, the downstream filling pool being configured to periodically, randomly, or continually compute a rolling average of vended unique sequence values for a specified period of time; and
receiving a request for additional unique sequence values when it is determined that the computed rolling average for the specified period of time indicates an increase above a predetermined threshold.

10. One or more non-transitory-computer-readable media as recited in claim 9, wherein the unique sequence values comprise incrementing values, and wherein the high water mark comprises a value corresponding to a highest unique sequence value that the first master has generated and vended or a highest unique sequence value that the first master has determined another master has generated and vended.

11. One or more non-transitory-computer-readable media as recited in claim 9, further storing computer-executable instructions that, when executed on the one or more processors, perform an act comprising generating and vending the first range of unique sequence values to the downstream filling pool if the second master or another master configured to generate and vend unique sequence values does not object to the indication.

12. One or more non-transitory-computer-readable media as recited in claim 9, further storing computer-executable instructions that, when executed on the one or more processors, perform acts comprising:
receiving a request for unique sequence values from a filling pool layer prior to the sending of the request to the second master; and
generating and vending the first range of unique sequence values to the filling pool layer from which the request was received if the second master or another master configured to generate and vend unique sequence values does not object to the indication.

13. One or more computing devices, comprising:
one or more processors; and
the one or more non-transitory-computer-readable media storing the computer-executable instructions as recited in claim 9.

14. A method implemented at least in part by one or more computing devices, comprising:
receiving a batch of unique sequence values generated by a master configured to generate and vend the unique sequence values;
storing a first portion of the batch of unique sequence values in a non-persistent memory accessible by a filling pool and storing another portion of the batch of unique sequence values in a persistent memory accessible by the filling pool, the filling pool maintaining a sufficient number of the unique sequence values so that filling pool can provide the unique sequence values to a client for at least a predetermined amount of time;

providing a unique sequence value stored in the non-persistent memory to the client in response to receiving a request for a unique sequence value from the client;

monitoring a rate that the filling pool provides the unique sequence values to one or more clients to calculate an average consumption by the one or more clients for the predetermined amount of time;

calculating an amount of the unique sequence values to store within the persistent and non-persistent memories accessible by the filling pool based at least in part on the calculated average consumption; and transferring at least some of the unique sequence values stored in the persistent memory accessible by the filling pool to the non-persistent memory.

15. A method as recited in claim 14, wherein the unique sequence values serve to uniquely identify database records of the client.

16. A method as recited in claim 14, further comprising:

monitoring an amount of unique sequence values stored in the non-persistent memory accessible by the filling pool, wherein the transferring of the unique sequence values stored in the persistent memory accessible by the filling pool to the non-persistent memory is performed in response to determining that the amount of unique sequence values stored in the non-persistent memory is less than a threshold amount.

17. A method as recited in claim 14, wherein the batch of unique sequence values is a first batch, and further comprising requesting a second batch of unique sequence values in response to determining that an amount of unique sequence values accessible by the filling pool is less than a threshold amount.

18. A method as recited in claim 14, wherein the batch of unique sequence values is a first batch, and further comprising:

requesting a second batch of unique sequence values in response to determining that an amount of unique sequence values accessible by the filling pool is less than a threshold amount;

receiving the second batch of unique sequence values in response to the request;

storing a portion of the second batch of unique sequence values in the non-persistent memory accessible by the filling pool; and storing any remaining values of the second batch of unique sequence values in the persistent memory accessible by the filling pool.

19. One or more non-transitory-computer-readable media storing computer-executable instructions that, when executed on the one or more processors, perform acts comprising:

determining a high water mark for a first master of a ring of masters, individual masters of the ring of masters being configured to generate and vend unique sequence values;

requesting, by the first master and to a second master of the ring of masters, permission to generate and vend a range of unique sequence values, the range being determined at least in part by the high water mark of the first master;

generating and vending the range of unique sequence values to one or more filling pools, wherein a first portion of the range of unique sequence values are stored in a non-persistent memory of the one or more filling pools and a second portion is stored in a persistent memory of the one or more filling pools; and receiving a request for additional unique sequence values when it is determined that a computed rolling average of the vended unique sequence values determined by the one or more filling pools indicates an increase above a predetermined threshold.

20. One or more non-transitory-computer-readable media as recited in claim 19, wherein the unique sequence values comprise incrementing numbers, and wherein the high water mark of the first master corresponds to a higher of: (i) a highest unique sequence value that the first master has previously generated and vended, or (ii) a highest unique sequence value known by the first master to have been previously generated and vended by another master of the ring of masters.

21. One or more non-transitory-computer-readable media as recited in claim 19, wherein the requesting of the permission comprises:

sending a first suggested range of unique sequence values to the second master;

if an objection to the first suggested range is received from the second master or another master, sending a second suggested range of unique sequence values that is different than the first suggested range to the second master; and otherwise, sending a message indicating that the first master will generate and vend the first suggested range of unique sequence values absent an objection from the second master or another master.

22. One or more non-transitory-computer-readable media as recited in claim 19, further storing computer-executable instructions that, when executed on the one or more processors, perform an act comprising receiving a request for a batch of unique sequence values from a filling pool layer associated with the one or more filling pools prior to the requesting of the permission.

23. One or more computing devices, comprising:

one or more processors; and the one or more non-transitory-computer-readable media storing the computer-executable instructions as recited in claim 19.

* * * * *